(12) United States Patent
Iwatsuki et al.

(10) Patent No.: US 6,439,622 B1
(45) Date of Patent: Aug. 27, 2002

(54) STRUCTURE FOR COUPLING TWO TYPES OF MEMBERS

(75) Inventors: Takane Iwatsuki, Kariya; Tetsuya Saeki, Toyota, both of (JP)

(73) Assignee: Toyoda Boshoku Corporation, Toyoda (JP)

( * ) Notice: Subject to any disclaimer, the term of this patent is extended or adjusted under 35 U.S.C. 154(b) by 0 days.

(21) Appl. No.: 09/413,015

(22) Filed: Oct. 6, 1999

(30) Foreign Application Priority Data

Mar. 12, 1999  (JP) .......................................... 11-067502

(51) Int. Cl.$^7$ .............................. F01N 7/18; F16L 55/00
(52) U.S. Cl. ....................... 285/423; 285/188; 181/250; 123/184.57
(58) Field of Search .............................. 403/381, 364, 403/355, 357, 353, 296; 285/423, 328, 905, 188, 21.2; 123/184.57; 181/229, 250

(56) References Cited

U.S. PATENT DOCUMENTS

| | | | | |
|---|---|---|---|---|
| RE8,807 E | * | 7/1879 | Cummings | 403/296 |
| 1,409,410 A | * | 5/1922 | Rockwell | 403/296 |
| 2,969,251 A | * | 1/1961 | Thomas | 403/29 |
| 3,666,302 A | * | 5/1972 | Kellett | 403/28 |
| 5,056,950 A | * | 10/1991 | Rateick, Jr. et al. | 403/24 |
| 5,806,480 A | * | 9/1998 | Maeda et al. | 123/184.57 |
| 6,047,997 A | * | 4/2000 | Olivier | 285/333 |
| 6,125,607 A | * | 10/2000 | Poce | 403/381 |
| 6,148,956 A | * | 11/2000 | Iwatsuki | 181/282 |
| 6,213,077 B1 | * | 4/2001 | Horii | 123/184.57 |

FOREIGN PATENT DOCUMENTS

| | | |
|---|---|---|
| JP | 61-286274 | 6/1985 |
| JP | 1-316244 | 12/1989 |
| JP | A-1-316244 | 12/1989 |
| JP | 3-40256 | 4/1991 |
| JP | U-3-42056 | 4/1991 |
| JP | 9-100960 | 10/1995 |
| JP | 9-151818 | 11/1995 |
| JP | 11-68284 | 8/1997 |

* cited by examiner

*Primary Examiner*—Lynne H. Browne
*Assistant Examiner*—Kenn Thompson
(74) *Attorney, Agent, or Firm*—Oliff & Berridge, PLC

(57) ABSTRACT

There is difference between coefficients of thermal expansion of the first member and the second member. A mismatch occurs between the walls of the first member and the second member when the temperature is changed significantly. Stress generated by this mismatch is distributed among and received by respective fitting sections of respective concave portions and respective convex portions. Because these fitting sections exist above and below the joining member, stress generated by the mismatch is distributed and received by the fitting sections before the stress reaches the joining member. Therefore, only a little stress acts on the joining member.

10 Claims, 7 Drawing Sheets

STRUCTURE FOR COUPLING TWO TYPES OF MEMBERS

INCORPORATION BY REFERENCE

The disclosure of Japanese Patent Application No. HEI 11-67502 filed on Mar. 12, 1999 including the specification, drawings and abstract is incorporated herein by reference in its entirety.

BACKGROUND OF THE INVENTION

1. Field of the Invention

The present invention relates to a structure for coupling two types of members that are different in coefficient of thermal expansion.

2. Description of the Related Art

For example, as a related art, a coupling structure between an air hose for supplying air to a vehicular engine and a resonator for reducing column resonance is known.

FIG. 5 is an exploded perspective view of an air hose and a resonator, FIG. 6 is a plan view of the air hose and the resonator, and FIG. 7 is a sectional view of the air hose and the resonator in FIG. 6 taken along line VII—VII. As shown in FIGS. 5 through 7, a portion of an air hose 101 is fit into a concave portion 102a of a resonator 102, and a cylindrical opening 101a of the air hose 101 is fit into a cylindrical hole 102b of the resonator 102. An annular joining member 103 is disposed between the cylindrical opening 101a and the cylindrical hole 102b, and the annular joining member 103 is embedded in an outer peripheral wall of the cylindrical opening 101a and in an inner peripheral wall of the cylindrical hole 102b so as to reinforce the coupling between the two members 101 and 102 and to provide sealing between the two members 101 and 102.

FIG. 8 is an enlarged sectional view of the annular joining member 103 disposed between the cylindrical opening 101a and the cylindrical hole 102b. The cylindrical opening 101a and the cylindrical hole 102b are engaged with each other at portions S1 and S2, respectively. The annular joining member 103 is shaped like a hook, and is embedded in the outer peripheral wall of the cylindrical opening 101a and in the inner peripheral wall of the cylindrical hole 102b.

The air hose 101 (shown in FIGS. 5 through 8) is disposed inside an engine room of a vehicle in a freely bendable manner. Therefore, material of the air hose 101 must have sufficient elasticity, and such material as polypropylene (PP), for example, is used. On the other hand, in many cases, the resonator 102 is disposed near an engine inside the engine room of the vehicle. Therefore, the resonator 102 requires a heat-resistant material such as nylon (PA).

Further, because chemical bonding of polypropylene and nylon is difficult, the annular joining member 103 is used to enhance sealability. Modified polypropylene, for example, is used as a material for the annular joining member 103.

However, the coefficient of thermal expansion for polypropylene is between $5 \times 10^{-5} K^{-1}$ and $11 \times 10^{-5} K^{-1}$, and between $2 \times 10^{-5} K^{-1}$ and $3 \times 10^{-5} K^{-1}$ for nylon, and there is a difference in coefficient of thermal expansion between the two materials. Also, a significant temperature fluctuation is caused in the vehicle engine room. Each time a significant temperature change is repeated, mismatch occurs between the cylindrical opening 101a of the air hose 101 and the cylindrical hole 102b of the resonator 102, due to the difference in coefficients of thermal expansion of polypropylene and nylon. Because the cylindrical opening 101a and the cylindrical hole 102b are engaged with each other at the portions S1 and S2, respectively, the mismatch between the cylindrical opening 101a and the cylindrical hole 102b cannot be counterbalanced. Consequently, a stress caused by the mismatch acts on the annular joining member 103, which may lead to breakage of the annular joining member 103.

Also, it is preferable that the annular joining member 103 be made compact and light-weight, because modified polypropylene used for annular joining member 103 is expensive. Making the annular joining member 103 larger for the improvement of strength leads to cost increase.

SUMMARY OF THE INVENTION

It is an object of the present invention to provide a structure for coupling two types of members which is capable of preventing breakage of a joining member used for joining two types of members having different coefficients of thermal expansion.

In a first aspect of the present invention, the walls of a first member and a second member that are different in coefficient of thermal expansion are superposed, and a joining member is embedded in respective walls of the first member and the second member to couple the two types of members, the first member and the second member. In this coupling structure, in a peripheral range of the joining member, a concave portion is formed in the wall of the first member, and a convex portion is formed on the wall of the second member. The concave and convex portions fit with each other.

According to the above aspect, the concave and convex portions of the first and the second members are fit in the peripheral range of the joining member. Accordingly, even if mismatch occurs between the first member and the second member due to the difference between coefficients of thermal expansion of the first and the second members, a stress generated thereby is received by a fitting section of the concave and the convex portions. Therefore, the stress does not entirely act on the joining member. Thus, the breakage of the joining member is prevented.

Further, in the above-mentioned aspect, the coefficients of thermal expansion of the first and the second members are different, and the concave portion is formed in either the first member or the second member having larger coefficient of thermal expansion than the other.

For example, if the coefficient of thermal expansion of the first member is greater than that of the second member, a convex portion is formed in the second member in advance. The temperature of the first member is raised up to its melting temperature, and then the first member is pressed against the second member. Thus, a concave portion to be fitted with the convex portion on the second member is formed in the first member. Because the coefficient of thermal expansion of the first member is the larger, the concave portion of the first member shrinks more than the convex portion of the second member when the first member is cooled down to a room temperature range. Accordingly, a clearance is not formed between the concave and convex portions, and the effect obtained from fitting the aforementioned concave and convex portions is maintained.

DETAILED DESCRIPTION OF THE PREFERRED EMBODIMENTS

Hereinafter, embodiments of the present invention will be described with reference to the accompanying drawings.

Figure 1:
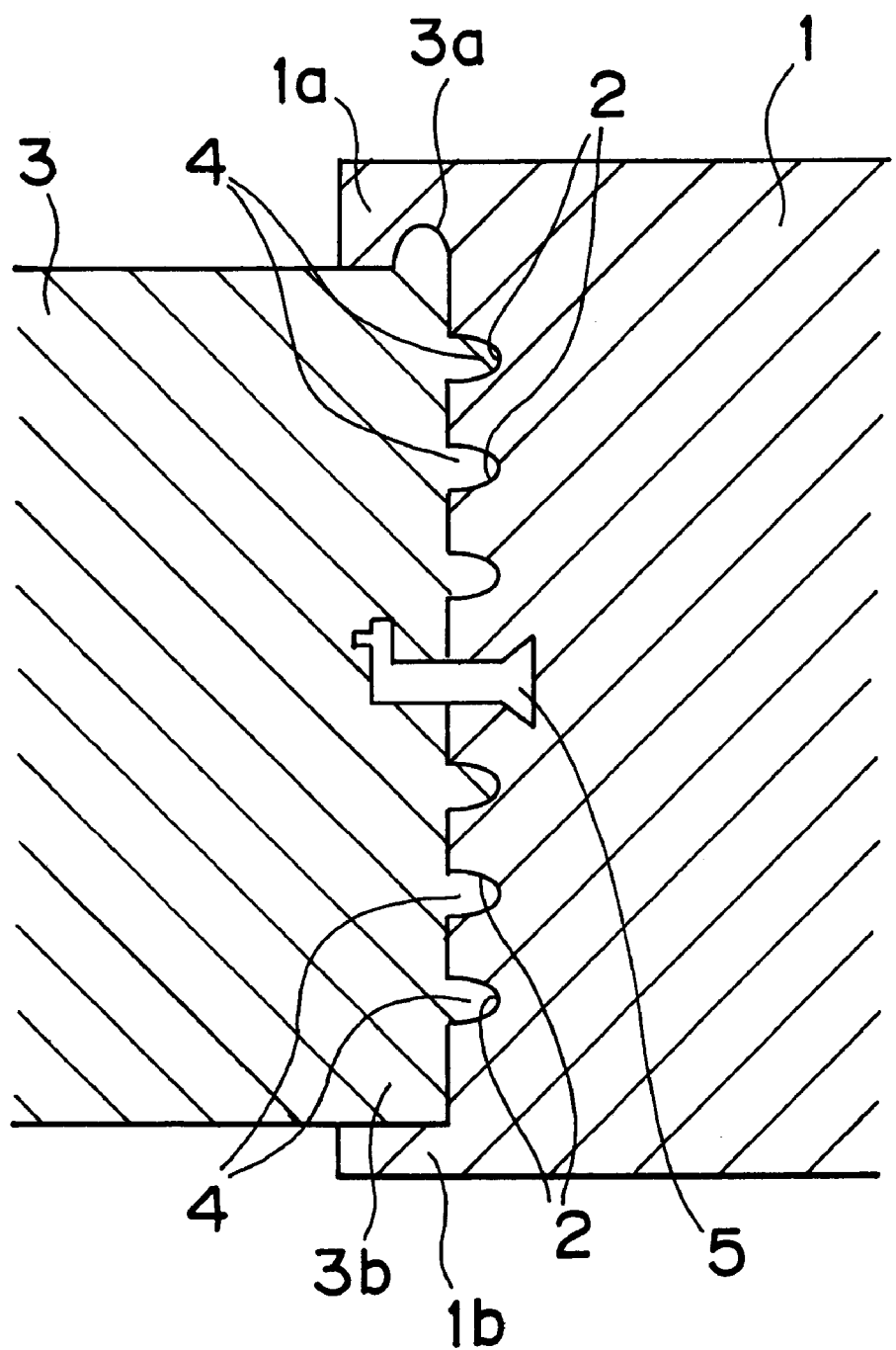
FIG. 1 is a sectional view of one embodiment of the coupling structure according to the present invention.

FIG. 1 is a sectional view of an embodiment of a coupling structure of the present invention. In FIG. 1, a plurality of groove-shaped concave portions 2 are formed in the wall of a first member 1, a plurality of convex portions 4 are formed on the wall of a second member 3, and each of the concave portions 2 of the first member 1 is fitted with a corresponding one of the convex portions 4 of the second member 3.

An upper end 1a of the first member 1 and an upper end 3a of the second member 3 are engaged with each other, and a lower end 1b of the first member 1 and a lower end 3b of the second member 3 are engaged with each other.

A joining member 5 is shaped like a hook, and is embedded in the walls of the first and the second members 1 and 3. The joining member 5 couples the first member 1 and the second members 3, and seals a gap therebetween.

The first member 1 is made of polypropylene (PP), for example, and the second member 3 is made of nylon (PA), for example. The joining member 5 is made of modified polypropylene, for example.

Here, the coefficient of thermal expansion of polypropylene is between $5 \times 10^{-5} K^{1}$ and $11 \times 10^{-5} K^{-1}$, and the coefficient of thermal expansion of nylon is between $2 \times 10^{-5} K^{-1}$ and $3 \times 10^{-5} K^{-1}$, and there is a difference between the two materials. Accordingly, mismatch occurs between a wall of the first member 1 and a wall of the second member 3 when the temperature is changed significantly. A stress generated by this mismatch is distributed among and received by respective fitting sections where the concave portions 2 are fitted with the convex portions 4. Because these fitting sections exist above and below the joining member 5, the stress is distributed among and received by each fitting section before the stress reaches the joining member 5. Accordingly, the stress scarcely acts on the joining member 5. Even when a significant temperature change is repeated, the joining member 5 is not broken because only a little stress is repeatedly applied to the joining member 5.

The melting temperature of polypropylene is lower than the melting temperature of nylon. Therefore, each convex portion 4 is formed on the wall of the second member 3 made of nylon in advance. Then, in coupling the first and the second members 1 and 3 via the joining member 5, the temperature of the first member 1 made of polypropylene is raised up to the melting temperature of polypropylene, and the first member 1 is pressed against the second member 3. Thereby, each convex portion 4 of the second member 3 serves as a mold, and each concave portion 3 which fits with each convex portion 4 is formed in the wall of the first member 1.

Because the coefficient of thermal expansion of polypropylene ranging from $5 \times 10^{5} K^{-1}$ to $11 \times 10^{-5} K^{-1}$ is greater than the coefficient of thermal expansion of nylon ranging from $2 \times 10^{-5} K^{-1}$ to $3 \times 10^{-5} K^{-1}$, the concave portions 3 of the first member 1 shrink more than the convex portions 4 of the second member 3 when the first member 1 made of polypropylene is cooled down to the room temperature range. Accordingly, clearance is not formed between respective concave portions 3 and respective convex portions 4, and the effect obtained from fitting respective aforementioned concave portions 2 and the convex portions 4 is maintained.

Figure 2:
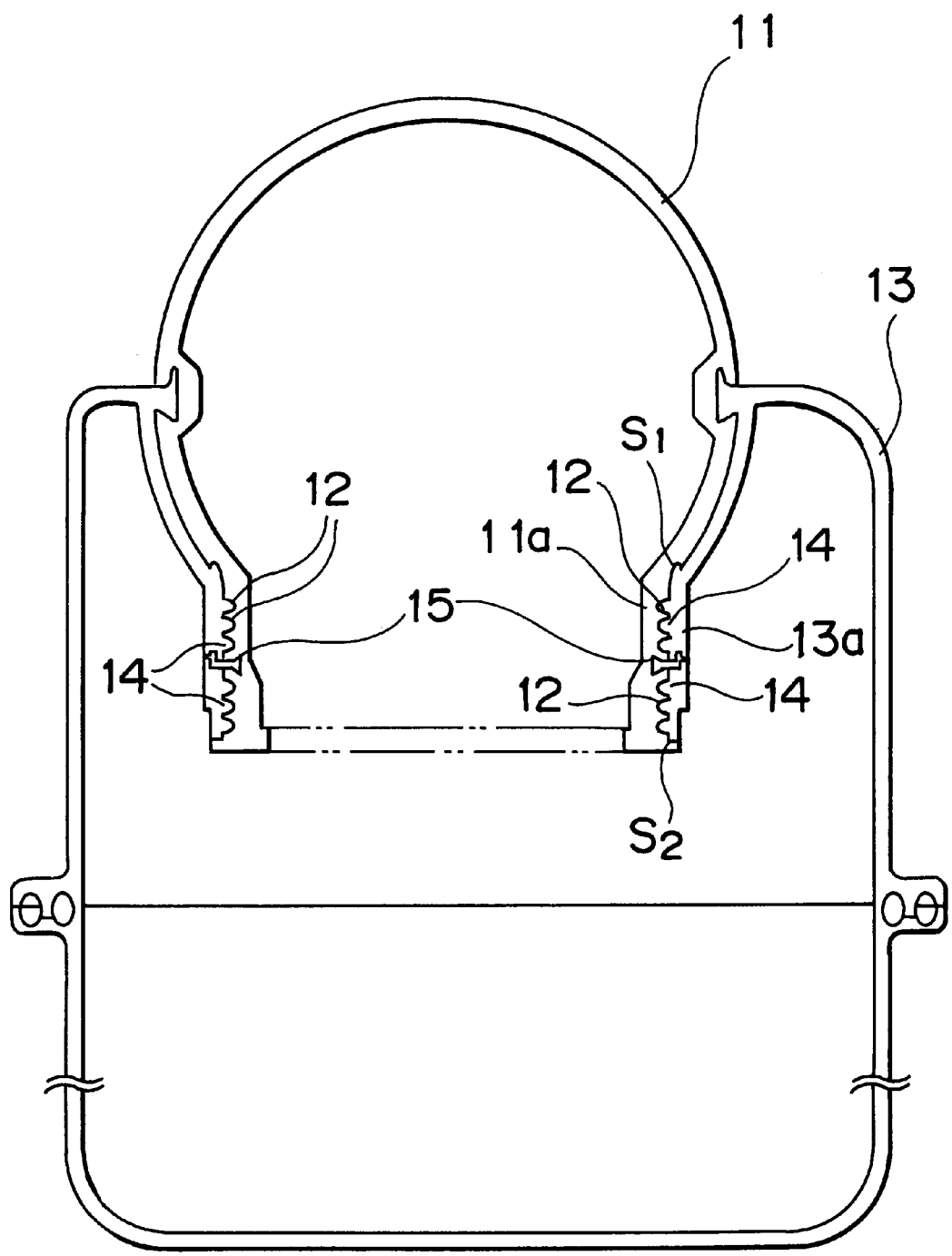
FIG. 2 is a sectional view of an air hose and a resonator to which the coupling structure of the present invention is applied.

FIG. 2 shows an air hose and a resonator to which the coupling structure of the present embodiment shown in FIG. 1 is applied. In FIG. 2, an air hose 11 is made of polypropylene and has a plurality of concave portions 12 in an outer peripheral wall of a cylindrical opening 11a thereof. A resonator 13 is made of nylon and has a plurality of convex portions 14 on an inner peripheral wall of a cylindrical hole 13a thereof. Each of the concave portions 12 is fitted with a corresponding one of the convex portions 14.

The cylindrical opening 11a and the cylindrical hole 13a are engaged with each other at respective portions S1 and S2.

An annular joining member 15 is made of modified polypropylene and is embedded in the outer peripheral wall of the cylindrical opening 11a and in the inner peripheral wall of the cylindrical hole 13a. The annular joining member 15 couples the cylindrical opening 11a and the cylindrical hole 13a, and seals a gap therebetween.

As mentioned earlier, a significant temperature change is repeated in the engine room of the vehicle. However, because the coupling structure of the present embodiment is applied between the cylindrical opening 11a of the air hose 11 and the cylindrical hole 13a of the resonator 13, even when a significant temperature change is repeated and mismatch is repeatedly generated between the cylindrical opening 11a and the cylindrical hole 13a, stress generated thereby is distributed among and received by each fitting section of respective concave portions 12 and respective convex portions 14. Accordingly, only a little stress acts on the annular joining member 15, and the annular joining member 15 is not broken. Also, it is not a problem to make the annular joining member 15 compact and light weight. Therefore, the amount of expensive modified polypropylene used may be reduced to cut down on costs. Alternatively, the shape of the annular joining member 15 may be simplified to facilitate a designing process or to reduce cost.

Here again, respective convex portions 14 are formed on the inner peripheral wall of the cylindrical hole 13a made of nylon in advance, and the temperature of the cylindrical opening 11a made of polypropylene is raised up to its melting temperature, in coupling the cylindrical opening 11a and the cylindrical hole 13a via the annular joining member 15. Then, the cylindrical opening 11a is pressed against the cylindrical opening 13a to form respective concave portions 12 which fit with respective convex portions 14 on the outer peripheral wall of the cylindrical opening 11a. Thereby, clearance is not formed between respective concave portions 12 and respective convex portions 14 when the cylindrical opening 11a is cooled down to ordinary temperature, and thus the breakage of the annular joining member 15 can be prevented for a long time. Because there is no clearance formed between respective concave portions 12 and respective convex portions 14, vibration and friction between the cylindrical opening 11a and the cylindrical hole 13a is curbed. Accordingly, no foreign objects enter between the cylindrical opening 11a and the cylindrical hole 13a, and flapping or noise of the resonator 13 is prevented.

Figure 3:
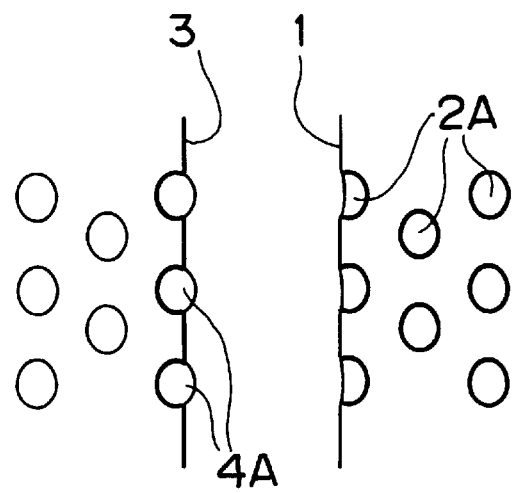
FIG. 3 is a perspective view of a modified example of the coupling structure of the present invention.
Figure 4:
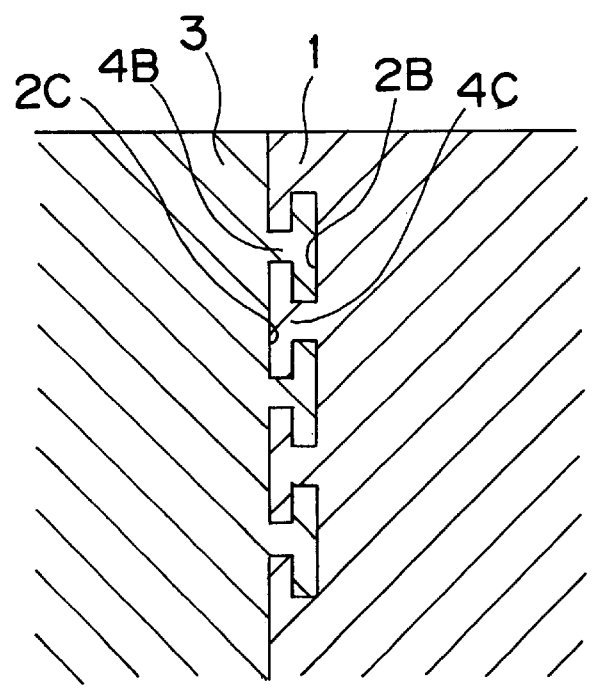
FIG. 4 is a sectional view of another modified example of the coupling structure of the present invention.
Figure 5:
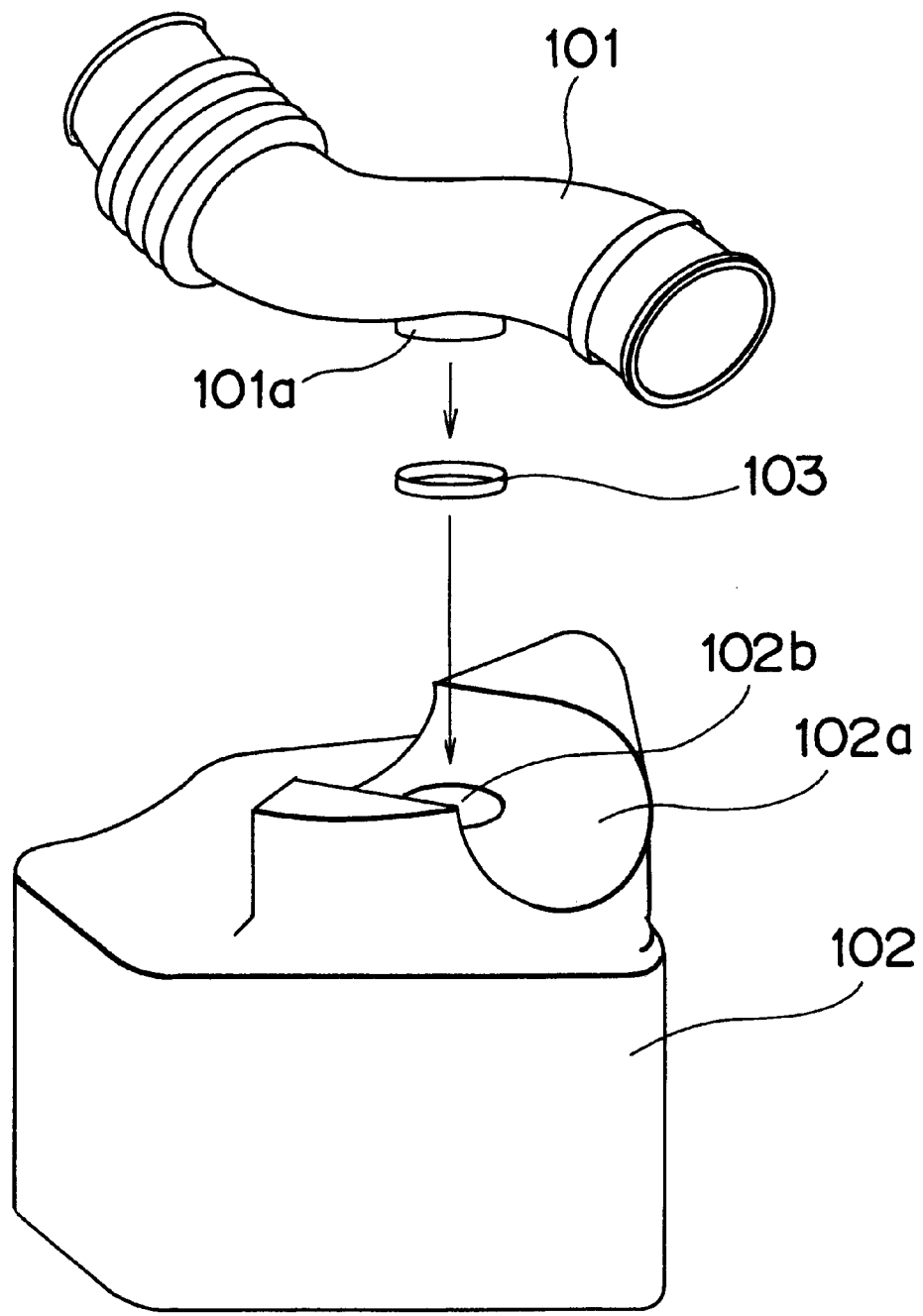
FIG. 5 is an exploded perspective view of the air hose and the resonator.
Figure 6:
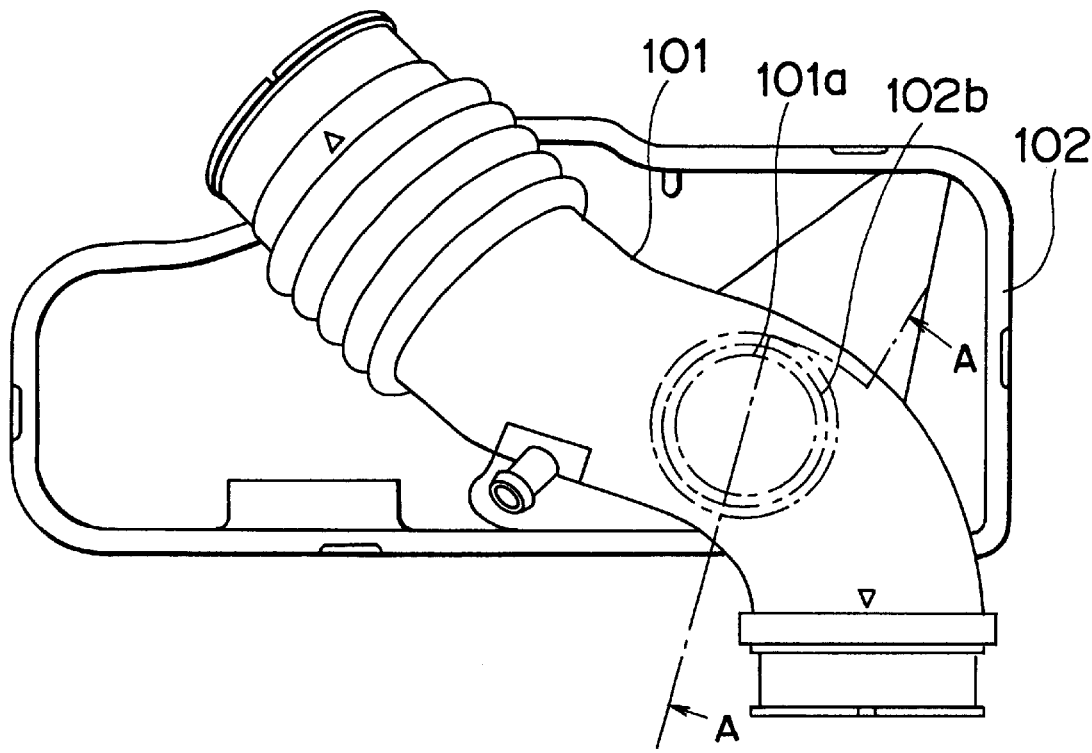
FIG. 6 is a plan view of the air hose and the resonator shown in FIG. 5.
Figure 7:
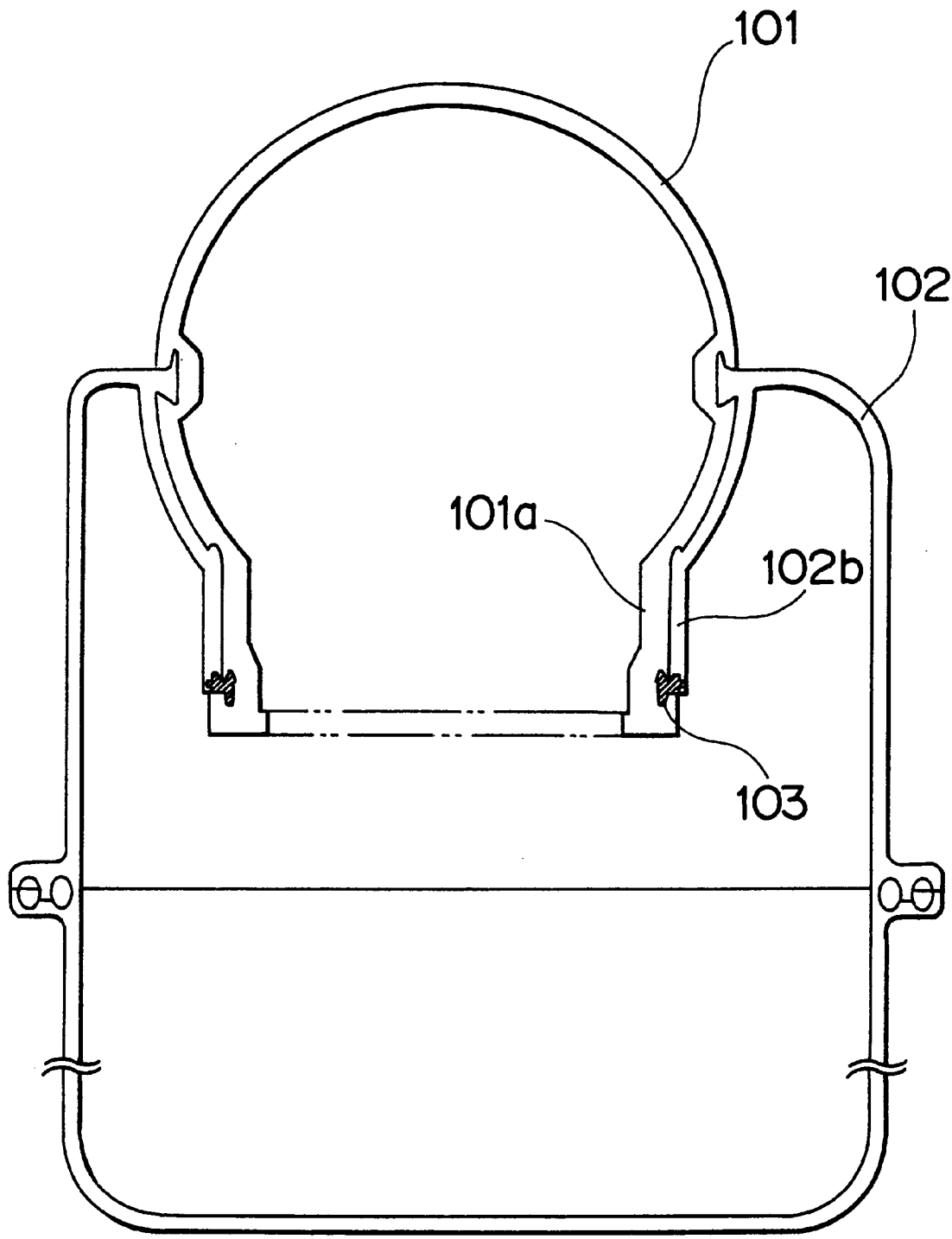
FIG. 7 is a sectional view of the air hose and the resonator shown in FIG. 6 taken along line VII—VII.
Figure 8:
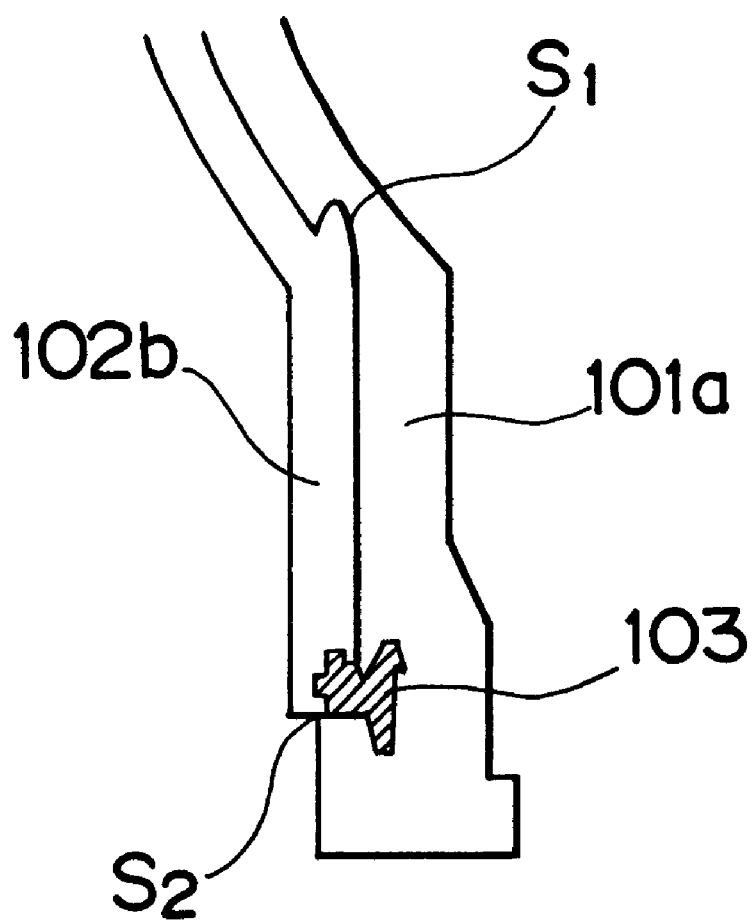
FIG. 8 is a partially enlarged sectional view of FIG. 7.

Further, the present invention is not limited to the scope of the above-mentioned embodiment, and it may be varied into many forms. For example, as shown in FIG. 3, respective semi-spherical concave portions 2A may be formed in the wall of the first member 1 and respective semi-spherical convex portions 4A may be formed on the wall of the second member 3 such that respective concave portions 2A and respective convex portions 4A fit with each other. Also, as shown in FIG. 4, respective hook-shaped concave portions 2B and convex portions 4C may be formed on the wall of the first member 1, and respective hook-shaped convex portions 4B and respective concave portions 2C may be formed on the wall of the second member 3 such that respective concave portions 2B and convex portions 4C, and respective convex portions 4B and concave portions 2C fit with each other.

In the modified example shown in FIG. 3, respective concave portions 2A may be formed by first forming respective convex portions 4A on the wall of the second member 3, then raising the temperature of the first member 1 up to its melting temperature, and then pressing respective convex portions 4A against the wall of the first member. In this case, the coefficient of thermal expansion of the first member 1 is set at a larger value than the coefficient of thermal expansion of the second member 3, which prevents a clearance from being formed between respective convex portions 4A and respective concave portions 2A after the first and the second members 1 and 3 are cooled down.

What is claimed is:

1. A coupling structure for coupling two types of members, a first member and a second member, that are different in coefficient of thermal expansion by superposing walls of the first and the second members, and embedding a joining member on respective walls of both the first and the second members, comprising:

a concave portion and a convex portion which fit with each other, the concave portion being formed in a wall of the first member and the convex portion being formed on a wall of the second member in a peripheral region of the joining member, wherein the joining member extends into the first and second members and is embedded inside both the first and second members.

2. The coupling structure according to claim 1, wherein the coefficients of thermal expansion of the first member and the second member are different, and the concave portion is formed in one of the first and second members that has a larger coefficient of thermal expansion than the other.

3. A coupling structure for coupling two types of members, a first and a second member, that are different in coefficient of thermal expansion by superposing walls of the first and the second members, and embedding a joining member on respective walls of both the first and the second members, comprising:

a concave portion and a convex portion which fit with each other, the concave portion being formed in a wall of the first member and the convex portion being formed on a wall of the second member in a peripheral region of the joining member, wherein the joining member is shaped like a hook.

4. The coupling structure according to claim 1, wherein the first member is made of polypropylene and the second member is made of nylon.

5. A coupling structure for coupling two types of members, a first and a second member, that are different in coefficient of thermal expansion by superposing walls of the first and the second members, and embedding a joining member on respective walls of both the first and the second members, comprising:

a concave portion and a convex portion which fit with each other, the concave portion being formed in a wall of the first member and the convex portion being formed on a wall of the second member in a peripheral region of the joining member, wherein the first member is an air hose for supplying air to an engine of a vehicle, and the second member is a resonator for reducing column resonance inside the air hose.

6. The coupling structure according to claim 1, wherein the convex portion has a semi-spherical shape.

7. A coupling structure for coupling two types of members, a first and a second member, that are different in coefficient of thermal expansion by superposing walls of the first and the second members, and embedding a joining member on respective walls of both the first and the second members, comprising:

a concave portion and a convex portion which fit with each other, the concave portion being formed in a wall of the first member and the convex portion being formed on a wall of the second member in a peripheral region of the joining member, wherein the convex portion is shaped like a hook.

8. The coupling structure according to claim 1, wherein the joining member is shaped like a hook.

9. The coupling structure according to claim 1, wherein the first member is an air hose for supplying air to an engine of a vehicle, and the second member is a resonator for reducing column resonance inside the air hose.

10. The coupling structure according to claim 1, wherein the convex portion is shaped like a hook.

* * * * *